April 16, 1946.  A. GAZDA  2,398,633
BOLT AND NUT ASSEMBLY
Filed June 14, 1943
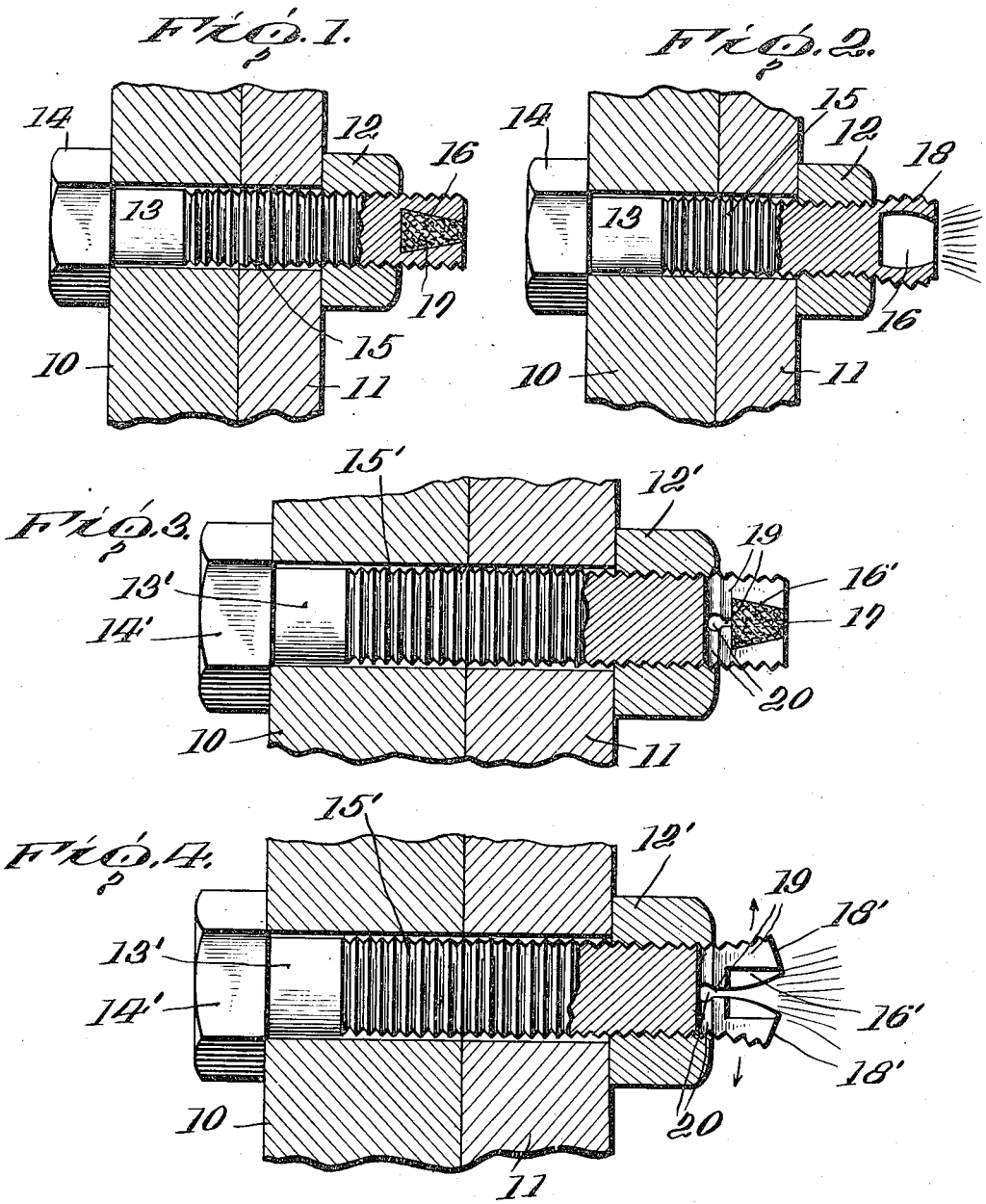
Inventor
Antoine Gazda
By E. F. Wenderoth
Attorney Patented Apr. 16, 1946

2,398,633

UNITED STATES PATENT OFFICE 2,398,633

BOLT AND NUT ASSEMBLY

Antoine Gazda, Providence, R. I.

Application June 14, 1943, Serial No. 490,789

5 Claims. (Cl. 151—31)

The present invention relates to a bolt and nut assembly and to a method of effecting the assembly. It also relates to a novel construction of threaded bolt.

It is, of course, standard practice to associate a plurality of parts with the aid of an externally threaded bolt or screw, retention of the assembled parts being effected by means of a nut threaded onto the free projecting end of the bolt. Frequently, however, as a result of disturbing influences such as vibrations and the like, the retaining nut is loosened and/or wholly dislodged, with manifestly undesirable results. Resort has been made with a greater or less degree of success to many expedients such as lock nuts and the like, in an effort to overcome the aforedescribed difficulty.

This invention provides a method and means for obviating the said difficulty without, however, having to employ additional parts such as an extraneous lock nut, lock washer or the like, by the simple expedient of assembling the parts and then expanding or spreading that portion of the bolt which projects beyond the nut (and on which the conventional lock nut or the like might normally be mounted) by means of expanding or spreading forces applied from within the said projecting portion. The result of this expedient is to modify the diameter of the bolt, at the projection portion thereof, so that it is greater at this point than elsewhere, the resultant relationship of parts effectively locking the nut in place against displacement from said bolt.

Other objects and advantages will appear from the following detailed description of presently-preferred embodiments of the invention, taken in the light of the accompanying sheet of drawings:

On the said sheet of drawings,

Fig. 1 is a view, partly in section and partly in elevation, of a nut and bolt assembly—the bolt being constructed in accordance with the principles of the present invention—, prior to the expansion of the outer bolt end;

Fig. 2 is a view, partly in section and partly in elevation, of the nut and bolt assembly of Fig. 1, after expansion of the outer bolt end;

Fig. 3 is a view, partly in section and partly in elevation, of a nut and bolt assembly, involving a modified form of bolt constructed according to the principles of this invention, prior to expansion of the projecting bolt end; and Fig. 4 is a view, partly in section and partly in elevation, showing the assembly of Fig. 3 after expansion of the bolt end.

Corresponding parts are designated by corresponding reference characters throughout the several figures of drawing.

Referring now to Figs. 1 and 2 of the drawing, this illustrates a relationship of parts comprising a pair of members to be bolted together, and bolt and nut means for effecting such bolting. The pair of members, designated by reference characters 10 and 11, typify any plurality of parts which are to be held in assembled relationship. They may, for example, represent two parts of a machine which is exposed to strong vibratory forces, or they may represent juxtaposed airplane parts which are subject to considerable vibration tending to loosen and dislodge the nut of a conventional nut and bolt assembly.

The nut and bolt means, according to the embodiment of Figs. 1 and 2, comprises a conventional nut 12 associated, as shown and hereinafter explained, with bolt 13. Bolt 13 may include the usual polygonal head 14, or other conventional bolt head construction, at one end of the bolt shank which may be exteriorly threaded along the major extent thereof, as at 15.

The outer or free end of the bolt shank is constructed according to the principles of the present invention as applied to a bolt made, for example, of duralumin, non-hardened steel or the like, and of relatively small diameter,—this being the type of bolt shown in Figs. 1 and 2 of the drawing.

As shown in the latter, the outer or free end of the bolt shank is provided with an undercut recess 16 of suitable configuration, which preferably is essentially frusto-conical in character, with the smaller end being open as shown. The longitudinal extent of the recess may preferably be substantially commensurate with the extent of the portion of bolt 13 which projects beyond nut 12.

Recess 16 is filled with an explosive chemical composition 17 of any suitable and/or desired character. For example, use may be made of a trinitrotoluol paste which is capable of explosion upon detonation or upon being fired by any other suitable means, as for instance by being touched with a hot instrument.

Explosion of the composition 17 will result in a bulging out of the wall encompassing recess 16, as shown at 18 in Fig. 2, the result being to lock nut 12 in place between member 11 and bulge 18. Head 14 having previously been drawn into close juxtaposition to member 10, the parts are securely retained in the desired assembled relationship.

An important feature is the configuration of the recess 16 and the disposition of the wider end thereof interiorly of the bolt. This is prerequisite to the formation of bulge 18, since otherwise the explosive composition 17 would merely blow out of recess 16 and would not cause the expansion of the end of the bolt extending beyond the nut.

Figs. 3 and 4 illustrate a modification of the relationship of parts according to this invention, particularly adapted in connection with bolts made of high alloy steel or of relatively large diameter.

As in the first embodiment, the members 10 and 11 are held together by bolt 13' provided with head 14' and screw-threaded shank 15' on which is arranged nut 12'; see Fig. 3 of the drawing, showing the assembly of these parts prior to the locking thereof together.

To enable the locking to be effected, the free or projecting end of the bolt is, as in the previously described embodiment, provided with an undercut or frusto-conical recess 16', corresponding to recess 16 of the first embodiment, which like the latter is filled with an explosive composition 17. In order to facilitate the spreading of the bolt end, the latter is, in this second form of the invention, provided with a plurality of cross slots 19—two such slots arranged substantially centrally of the bolt end and at substantial right angles to each other being shown in Figs. 3 and 4. The result is to subdivide the free shank end into a plurality—in the illustrated case, four—of spreadable segments 18'. (For the sake of clearness, the showing on the drawing exaggerates the size of slots 19. Actually, these slots are very narrow, with the walls thereof in close juxtaposition.) In order further to enhance the spreadability of the segments 18', each slot 19 is provided at the bottom thereof with an enlarged rounded bore, as shown at 20, extending all the way across the bolt.

Spreading of the segments 18' into the position shown in Fig. 4 is accomplished by exploding the composition 17 of recess 16', whereupon the nut 12' and all the parts are securely locked against undesired relative movement.

It will be apparent from the foregoing description that the present invention provides a nut and bolt assembly involving a relationship of parts which accomplishes the objects of the invention.

Having thus described the invention, what is claimed is:

1. A bolt of the character described comprising a head and an externally threaded bolt shank extending therefrom, the free end of said shank being provided with an undercut open-ended recess, which is essentially frusto-conical in configuration, with the smaller end being open, and an explosive composition in said recess.

2. A bolt of the character described comprising a head and a bolt shank extending therefrom, said shank being externally threaded along the major extent thereof, said shank terminating in a slotted free end, whereby a plurality of outwardly flarable segments are provided at said end, the free end of said shank being provided with an undercut open-ended recess, which is essentially frusto-conical in configuration, with the smaller end being open, and means in said bolt for spreading said segments into outwardly flared position.

3. A bolt of the character described comprising a head and a bolt shank extending therefrom, said shank being externally threaded along the major extent thereof, said shank terminating in a slotted free end, said free end comprising a plurality of slots arranged at an angle with respect to each other, whereby a plurality of outwardly flarable segments are provided at said end, the bottom of each said slot terminating in an enlarged bore, the free end of said shank being provided with an undercut open-ended recess, which is essentially frusto-conical in configuration, with the smaller end being open, and means in said bolt for spreading said segments into outwardly flared position.

4. A bolt of the character described comprising a head and a bolt shank extending therefrom, said shank being externally threaded along the major extent thereof, said shank terminating in a slotted free end, said free end comprising a plurality of slots arranged at an angle with respect to each other, whereby a plurality of outwardly flarable segments are provided at said end, said end being provided with an undercut open-ended recess of frusto-conical configuration, with the smaller end being open, and an explosive composition in said recess.

5. A bolt of the character described comprising a head and a bolt shank extending therefrom, said shank being externally threaded along the major extent thereof, said shank terminating in a slotted free end, whereby a plurality of outwardly flarable segments are provided at said end, the bottom of said slot terminating in an enlarged bore, said end being provided with an undercut open-ended recess of frusto-conical configuration, with the smaller end being open, and an explosive composition in said recess.

ANTOINE GAZDA.